(12) United States Patent
Nakamura

(10) Patent No.: US 7,292,461 B2
(45) Date of Patent: Nov. 6, 2007

(54) SWITCHING POWER SOURCE APPARATUS

(75) Inventor: Masaru Nakamura, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 0 days.

(21) Appl. No.: 11/549,850

(22) Filed: Oct. 16, 2006

(65) Prior Publication Data

US 2007/0086218 A1 Apr. 19, 2007

(30) Foreign Application Priority Data

Oct. 17, 2005 (JP) .............................. 2005-301912

(51) Int. Cl.
*H02M 3/335* (2006.01)
(52) U.S. Cl. ................................. 363/21.01; 363/21.03
(58) Field of Classification Search .................. 363/20, 363/21.01, 21.02, 21.03, 131
See application file for complete search history.

(56) References Cited

U.S. PATENT DOCUMENTS

| | | | | |
|---|---|---|---|---|
| 4,616,300 A | * | 10/1986 | Santelmann, Jr. | ......... 363/21.02 |
| 5,497,311 A | * | 3/1996 | Hanawaka | ................ 363/21.03 |
| 6,166,926 A | * | 12/2000 | Nath et al. | ................ 363/21.03 |
| 6,366,476 B1 | * | 4/2002 | Yasumura | ................ 363/21.02 |
| 6,788,556 B2 | * | 9/2004 | Hosotani et al. | .......... 363/21.15 |
| 7,035,119 B2 | * | 4/2006 | Koike | ........................... 363/19 |
| 7,212,415 B2 | * | 5/2007 | Osaka | ..................... 363/21.02 |

FOREIGN PATENT DOCUMENTS

JP 8-289543 11/1996

OTHER PUBLICATIONS

U.S. Appl. No. 11/528,542, filed Sep. 28, 2006, Nakamura.

* cited by examiner

*Primary Examiner*—Adolf Berhane
(74) *Attorney, Agent, or Firm*—Oblon, Spivak, McClelland, Maier & Neustadt, P.C.

(57) ABSTRACT

A switching power source apparatus has a switching element being connected with a DC power source through a primary winding of a transformer in which parasitic capacitance exists between terminals of the switching element. A voltage V4 of free oscillation appears at a gate of the switching element after a flyback period due to the parasitic capacitance. Based on the free oscillation voltage, the switching power source apparatus detects timing synchronized with a period of the free oscillation, outputs a trigger signal V10 based on the detected timing, uses the trigger signal to estimate bottom timing when the free oscillation reaches a bottom level the second time, outputs an ON start signal V9 synchronized with the bottom timing, uses the ON start signal to output an ON control signal to turn on the switching element, and drives the switching element in response to the ON control signal.

4 Claims, 3 Drawing Sheets

SWITCHING POWER SOURCE APPARATUS

BACKGROUND OF THE INVENTION

1. Field of the Invention

The present invention relates to a switching power source apparatus based on a quasi-resonance control method, and particularly, to a switching power source apparatus capable of improving power conversion efficiency and reducing switching noise.

2. Description of the Related Art

The quasi-resonance control method is one of methods for controlling a switching power source apparatus having a switching element. During an OFF period of the switching element, a voltage of free oscillation occurring at a drain of the switching element drops. When the voltage drop reaches a bottom level, the quasi-resonance control method detects it and turns on the switching element so as to reduce a switching loss and noise. The method is disclosed in, for example, Japanese Patent Publication No. 08-289543.

A switching power source apparatus proposed in the above-mentioned patent publication has a primary circuit connected to a primary winding of a transformer, a secondary circuit connected to a secondary winding of the transformer, and a controller connected to a tertiary winding of the transformer. The controller detects a bottom voltage of free oscillation after a flyback period and controls a switching element accordingly.

SUMMARY OF THE INVENTION

Generally, a switching power source apparatus employing the quasi-resonance control method is manufactured by integrating a part of the apparatus into a semiconductor integrated circuit and by fabricating the apparatus into a small-size package, to improve mass productivity.

According to the related art, it is necessary to prepare dedicated terminals on a semiconductor integrated circuit on which the primary circuit and controller are integrated, to directly connect the semiconductor integrated circuit to the tertiary winding of the transformer.

This configuration makes it difficult to fabricate the switching power source apparatus in a small-size package. To detect a voltage generated on the tertiary winding of the transformer, the tertiary winding must be connected to rectification elements such as diodes. This increases the cost of the switching power source apparatus.

According to the related art, the timing of turning on the switching element of the switching power source apparatus varies depending on constants determined by external parts. This makes it difficult to correctly estimate a time point when a voltage of free oscillation occurring during an OFF period of the switching element reaches a bottom level. The incorrect estimation of the bottom level reaching point results in deteriorating power conversion efficiency and causing switching noise.

There is a need, therefore, for correctly predicting the timing at which a voltage of free oscillation occurring at the drain of a switching element in an OFF period of the switching element reaches a bottom level.

According to the present invention, a switching power source apparatus employing a circuit configuration based on the quasi-resonance control method, capable of reducing package size, switching loss, and switching noise and simplifying the structure of the switching power source apparatus can be provided.

According to the present invention, a switching power source apparatus capable of correctly estimating a time point when a voltage of free oscillation occurring at the drain of a switching element in an OFF period of the switching element reaches a bottom level can be provided.

A first aspect of the present invention provides a switching power source apparatus including a switching element connected in series with a DC power source through a primary winding of a transformer; a voltage detector configured to detect timing synchronized with a period of voltage free oscillation and output a detection signal, the voltage free oscillation occurring at a gate of the switching element after a flyback period due to parasitic capacitance between terminals of the switching element or optionally added capacitance; a timing corrector configured to estimate, according to the detection signal from the voltage detector, timing when the voltage free oscillation substantially reaches a bottom level the second time or later and output an ON start signal at the estimated timing; a controller configured to output, in response to the ON start signal from the timing corrector, an ON control signal to turn on the switching element; and a driver configured to apply, in response to the ON control signal from the controller, a drive signal to the gate of the switching element and thereby drive the switching element.

According to a second aspect which is based on the first aspect of the present invention, the timing corrector estimates, based on a first trigger signal provided by the voltage detector, timing when the voltage free oscillation substantially reaches a bottom level the second time or later and output the ON start signal in synchronization with the estimated timing.

According to a third aspect which is based on the first aspect of the present invention, the timing corrector includes a first capacitor configured to be selectively connected to and charged by a constant current source; a voltage retention circuit having a second capacitor, configured to selectively be connected to the first capacitor; and a comparator. The voltage retention circuit is connected to the first capacitor during an effective period of a first trigger signal provided by the voltage detector, to hold a first voltage at the second capacitor. The first capacitor is charged during an effective period of a second trigger signal provided by the voltage detector, to have a second voltage. The comparator detects a time point when the second voltage becomes higher than the first voltage and provides the detected time point as estimated timing at which the voltage free oscillation substantially reaches a bottom level the second time.

A fourth aspect of the present invention provides a switching power source apparatus including a switching element connected in series with a DC power source through a primary winding of a transformer; a second winding of the transformer arranged on the primary side of the transformer; a voltage detector configured to detect timing synchronized with a period of voltage free oscillation and output a trigger signal, the voltage free oscillation occurring at the second winding after a flyback period; a timing corrector configured to automatically estimate, according to the trigger signal from the voltage detector, timing when the voltage free oscillation substantially reaches a bottom level the second time or later and output an ON start signal at the estimated timing; a controller configured to output, in response to the ON start signal from the timing corrector, an ON control signal to turn on the switching element; and a driver configured to apply, in response to the ON control signal from the controller, a drive signal to a gate of the switching element and thereby drive the switching element.

DESCRIPTION OF THE PREFERRED EMBODIMENT

Switching power source apparatuses according to embodiments of the present invention will be explained in detail with reference to the drawings.

Figure 1:
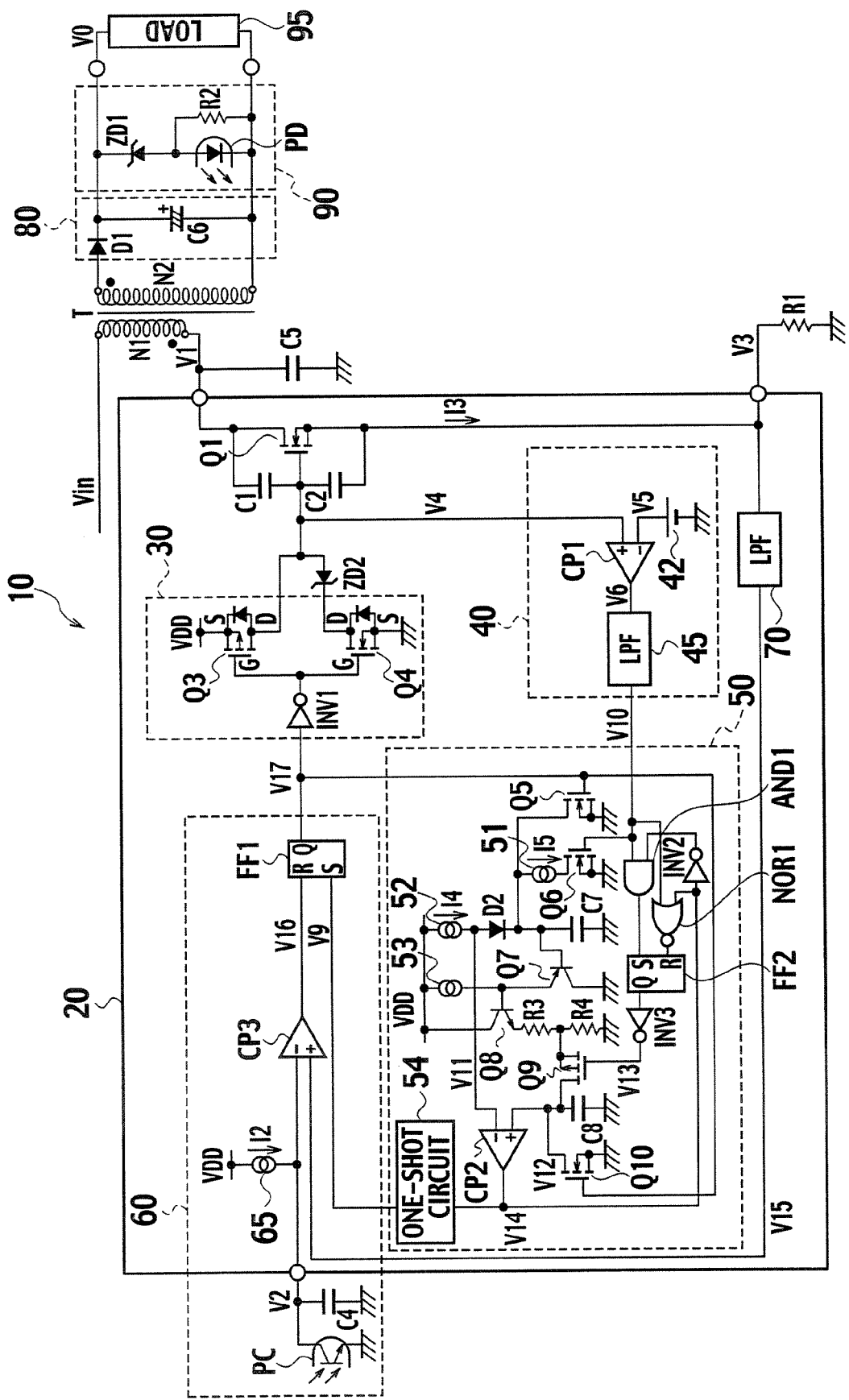
FIG. 1 is a view showing a switching power source apparatus according to an embodiment of the present invention.

FIG. 1 shows a switching power source apparatus 10 according to an embodiment of the present invention. The switching power source apparatus 10 has a primary circuit connected to a primary winding N1 of a transformer T and a secondary circuit connected to a secondary winding N2 of the transformer T. Main elements of the primary circuit are arranged in a semiconductor integrated circuit 20. The transformer T transfers electric energy stored at the primary circuit to the secondary circuit through the windings N1 and N2.

In the primary circuit, a first terminal of the primary winding N1 of the transformer T receives a DC voltage Vin from a DC power source (not shown). A second terminal of the primary winding N1 is connected in series with a drain of a switching element Q1. The switching element Q1 is an n-type MOSFET to drive the primary winding N1. A connection point between the primary winding N1 of the transformer T and the drain of the switching element Q1 is grounded through a capacitor C5. The capacitance of the capacitor C5 includes parasitic capacitance between the terminals of the switching element Q1 and stray capacitance of the transformer T.

The switching element Q1 has parasitic capacitance C1 existing between the gate and drain thereof and parasitic capacitance C2 existing between the gate and source thereof. The gate, drain, and source terminals of the switching element Q1 are capacitively coupled on a semiconductor substrate. The gate of the switching element Q1 is commonly connected to a drain of a drive element Q3 having a p-type MOSFET and an anode of a Zener diode ZD2. A cathode of the Zener diode ZD2 is connected to a drain of a drive element Q4 made of an n-type MOSFET. The drive elements Q3 and Q4 and Zener diode ZD2 are in a driver 30.

The gate of the switching element Q1 is connected to a positive input terminal of a comparator CP1 of a voltage detector 40.

Free Oscillation Detector

A free oscillation detector has the voltage detector 40 and a timing corrector 50. The free oscillation detector detects the timing of a given phase of a free oscillation voltage appearing at the gate of the switching element Q1 after a flyback period.

When the switching element Q1 is OFF, a parasitic oscillation occurs at the drain of the switching element Q1, to produce a free oscillation voltage that is divided by the parasitic capacitances C1 and C2 into an AC signal V4. The AC signal V4 is supplied to the positive input terminal of the comparator CP1. If the AC signal V4 is lower than a reference voltage V5 supplied to a negative input terminal of the comparator CP1, an output terminal of the comparator CP1 outputs a low (L)-level trigger signal V6 to a low-pass filter LPF45.

The trigger signal V6 supplied to the low-pass filter LPF45 contains noise components such as high-frequency ringing noise caused at the drain of the switching element Q1 just after the switching element Q1 is turned off. The low-pass filter LPF45 removes such noise components from the trigger signal V6 and outputs a noise-removed trigger signal V10 to the timing corrector 50, thereby preventing an erroneous operation.

An output terminal of the low-pass filter LPF45 is commonly connected to an input terminal of an AND gate AND1, an input terminal of a NOR gate NOR1, and a gate of a switching element Q6 having an n-type MOSFET. These components AND1, NOR1, and Q6 are included in the timing corrector 50.

Based on a first trigger signal (V10) supplied from the voltage detector 40, the timing corrector 50 estimates bottom timing at which a free oscillation voltage approaches a bottom level the second time, and outputs an ON start signal (V9) in synchronization with the estimated bottom timing to a controller 60.

When the trigger signal V10 outputted from the voltage detector 40 changes from high level to low level, the switching element Q6 turns off and a constant current I4 provided by a constant current source 52 passes through a diode D2 to charge a capacitor C7. In other words, the capacitor C7 is selectively connected to the constant current source 52 under the control of the switching element Q6.

On the other hand, when the trigger signal V10 outputted from the voltage detector 40 changes from low level to high level, the switching element Q6 turns on and a constant current I5 provided by a constant current source 51, which is larger than the constant current I4 (for example, double the current I4), flows to the ground thus discharging the capacitor C7.

A negative input terminal (inverting input terminal) of a comparator CP2 is connected to the constant current source 52 and an anode of the diode D2. A cathode of the diode D2 is commonly connected to a drain of a switching element Q5, an end of the constant current source 51, an end of the capacitor C7, and a base of a transistor Q7.

A positive input terminal (non-inverting input terminal) of the comparator CP2 is connected to a drain of a switching element Q9, an end of a capacitor C8 for retaining a voltage level V12, and a drain of a switching element Q10.

The negative input terminal of the comparator CP2 receives a voltage signal V11 that is higher than a terminal voltage of the capacitor C7 by a forward voltage drop VF of the diode D2.

The terminal voltage of the capacitor C7 is impedance-converted by a voltage follower circuit having the pnp transistor Q7 and an npn transistor Q8. The impedance-converted voltage at an emitter of the transistor Q8 is divided by resistors R3 and R4, and the attenuated voltage is supplied to the capacitor C8 through the source and drain of the switching element Q9 having an n-type MOSFET. The terminal voltage V12 of the capacitor C8 is supplied to the positive input terminal of the comparator CP2.

An input terminal of the AND gate AND1 is connected to an input terminal of the timing corrector 50. An output signal V14 of the comparator CP2 is inverted by an inverter INV2 and is supplied to the other input terminal of the AND gate AND1. An output terminal of the AND gate AND1 is connected to a set terminal of an SR flip-flop FF2.

An input terminal of the NOR gate NOR1 is connected to the input terminal of the timing corrector 50, the other input terminal of the NOR gate NOR1 is directly connected to the output terminal (voltage V14) of the comparator CP2, and an output terminal of the NOR gate NOR1 is connected to a reset terminal of the SR flip-flop FF2.

An output (Q) terminal of the SR flip-flop FF2 is connected through an inverter INV3 to a gate of the switching element Q9 having an n-type MOSFET to charge/retain the capacitor C8.

The switching element Q5 having an n-type MOSFET discharges the capacitor C7 when an ON/OFF control signal V17 supplied from an RS flip-flop FF1 of the controller 60 becomes high. The switching element Q10 having an n-type MOSFET discharges the capacitor C8 when the ON/OFF control signal V17 supplied from the RS flip-flop FF1 of the controller 60 becomes high.

When the output signal V14 of the comparator CP2 changes from high level to low level, a one-shot circuit 54 outputs an ON start signal V9 having a predetermined width (t6 to t7 of FIG. 2) to a set terminal of the SR flip-flop FF1 of the controller 60.

Controller

A reset terminal of the SR flip-flop FF1 is connected to an output terminal of a comparator CP3. If a sawtooth voltage signal V15 is larger than a feedback voltage V2 (FB voltage), the comparator CP3 outputs a high-level pulse signal (reset signal).

An output terminal of the SR flip-flop FF1 is connected to an input terminal of an inverter INV1 arranged in the driver 30. In the driver 30, an output terminal of the inverter INV1 is commonly connected to the gates of the drive element Q3 made of a p-type MOSFET and drive element Q4 made of an n-type MOSFET. The driver 30 turns on and off the switching element Q1.

Secondary Circuit

On the secondary side, the secondary winding N2 of the transformer T is connected to an anode of a diode D1. A cathode of the diode D1 is connected to an end of a capacitor C6. The diode D1 and capacitor C6 form a rectifier-smoother 80 to rectify and smooth a pulse voltage generated by the secondary winding N2 of the transformer T. An output of the rectifier-smoother 80 is connected to an output voltage detector 90 and a load 95.

The output voltage detector 90 includes a resistor R2 and a Zener diode ZD1 that are connected in series. The resistor R2 is connected in parallel with a photodiode PD. If a voltage applied to a cathode of the Zener diode ZD1 exceeds a Zener voltage, an error voltage is applied to an anode of the photodiode PD. Then, the photodiode PD outputs an optical signal according to the error voltage to a photocoupler PC that is optically connected to the photodiode PD.

Operation of the switching power source apparatus of FIG. 1 will be explained with reference to the timing chart of FIG. 2.

Flyback Period T1

Figure 2:
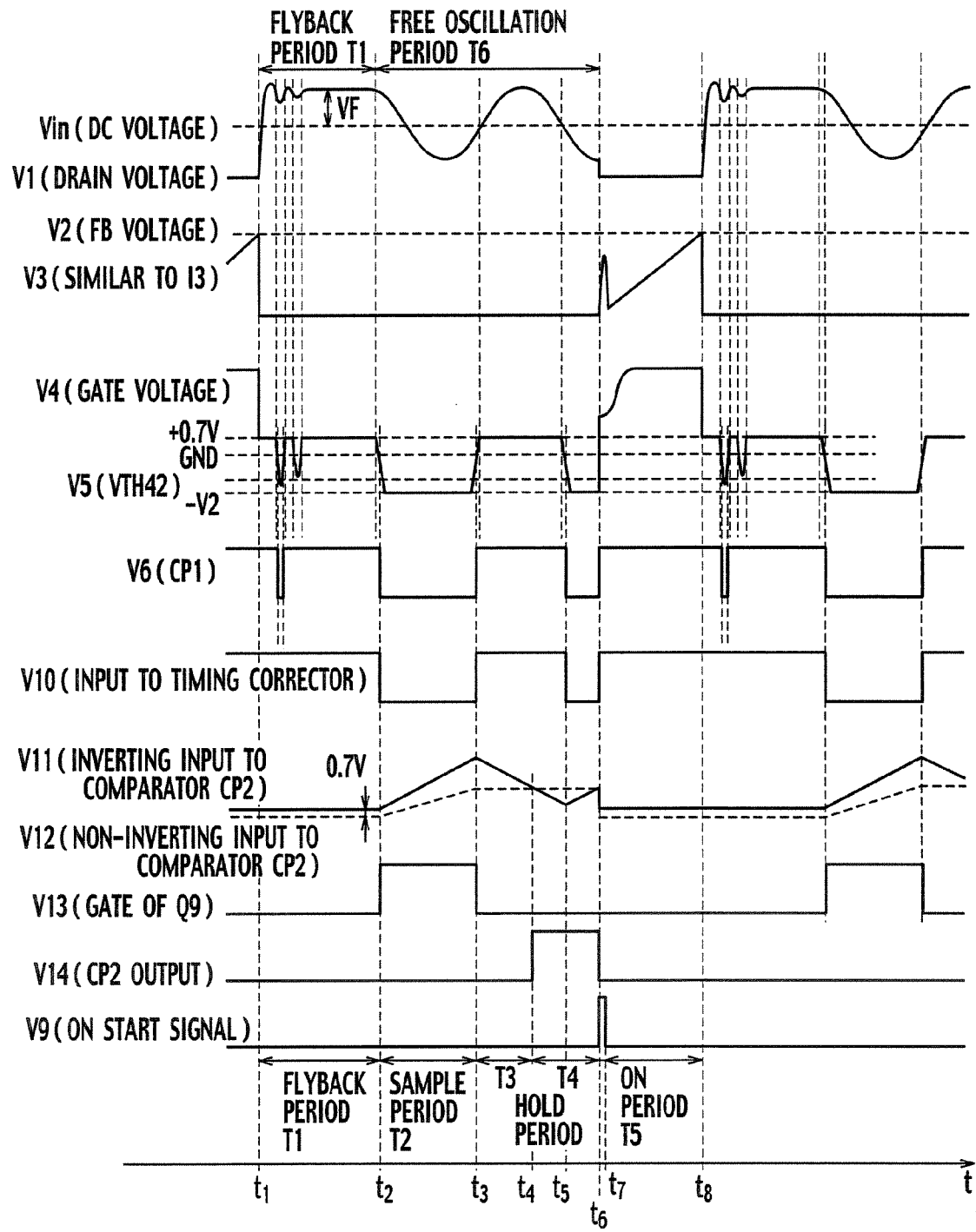
FIG. 2 is a time chart explaining operation of the switching power source apparatus of FIG. 1.

In FIG. 2, a period from t1 to t2 is a flyback period T1 which starts just after the switching element Q1 is turned off. During the flyback period T1, energy accumulated in the transformer T during an ON period of the switching element Q1 is discharged. In this period, the drain of the switching element Q1 outputs the DC voltage Vin superimposed by a flyback voltage VF.

The flyback voltage VF is substantially expressed by, VF=Vo (N1/N2), where Vo is an output voltage, N1 is the number of turns of the primary winding N1 of the transformer T, and N2 is the number of turns of the secondary winding N2 of the transformer T.

At this time, the voltage signal V4 supplied to the voltage detector 40 is higher than the reference voltage V5, and therefore, the trigger signal V10 supplied from the voltage detector 40 to the timing corrector 50 is high. As a result, the switching element Q6 turns on not to charge the capacitor C7 and the switching element Q9 turns off not to charge the capacitor C8.

The output signal V14 from the comparator CP2 is low to supply a high-level signal to the set terminal of the SR flip-flop FF2, thereby turning off the switching element Q9.

Sample Period T2

After the flyback period T1, a sample period T2 (from t2 to t3) as the effective period starts. At the drain of the switching element Q1, an inductance component of the primary winding N1 of the transformer T and the capacitance of the resonant capacitor C5 cause parasitic oscillation to produce a free oscillation voltage waveform around the DC voltage Vin.

An AC component of the free oscillation is divided by the parasitic capacitances of the switching element Q1 and is clamped by the zener diode ZD2 at a clamp voltage −Vzd2 (V5>−Vzd2), to provide a rectangular voltage signal V4 to the positive input terminal of the comparator CP1 in the voltage detector 40.

The negative input terminal of the comparator CP1 of the voltage detector 40 receives the negative reference voltage V5 (for example, −0.5 V). When the voltage V4 becomes lower than the reference voltage V5, the trigger signal V6 of the comparator CP1 changes from high to low to have an effective value. The low-pass filter 45 removes noise from the trigger signal V6 and provides a noise-removed trigger signal V10 to the input terminal of the timing corrector 50.

When the free oscillation voltage V1 occurring at the drain of the switching element Q1 starts to fall, the timing corrector 50 receives a first low-level trigger signal V10.

In response to the first low-level trigger signal V10, the switching element Q6 turns off, and therefore, the constant current source 52 provides the constant current I4 to the capacitor C7 through the diode D2, thereby charging the capacitor C7. Due to this, the input voltage V11 to the negative input terminal of the comparator CP2 starts to increase.

At this time, the output signal V14 from the comparator CP2 is low, and therefore, the NOR gate NOR1 outputs a high-level signal to reset the SR flip-flop FF2. This turns on the switching element Q9 to increase the potential V12 of the capacitor C8 due to the potential of the capacitor C7 divided by the resistors R3 and R4.

Retention Period T3

In FIG. 2, a period from t3 to t4 is a retention or hold period T3. When the free oscillation voltage occurring at the drain of the switching element Q1 increases above an oscillation center voltage, the trigger signal V10 supplied from the voltage detector 40 to the timing corrector 50 rises.

At this time, the output signal V14 of the comparator CP2 is low, so that the output of the SR flip-flop FF2 is high and the output signal V13 of the inverter INV3 is low. The output signal V13 is supplied to the gate of the switching element Q9, to turn off the switching element Q9. This results in keeping the charge of the capacitor C8 at time t3 and maintaining the voltage level V12.

At this time, the trigger signal V10 from the voltage detector 40 is high, to turn on the switching element Q6, discharge the capacitor C7 due to the constant current I5, and decrease the voltage V11 supplied to the negative input terminal of the comparator CP2.

When the voltage V11 to the negative input terminal of the comparator CP2 becomes lower than the voltage V12 of the capacitor C8 connected to the positive input terminal of the comparator CP2, the output V14 of the comparator CP2 changes from low level to high level at time t4.

Retention Period T4

In FIG. 2, a period from t4 to t6 is a retention or hold period T4. The free oscillation voltage occurring at the drain of the switching element Q1 starts to fall. When the falling free oscillation voltage drops below the oscillation center voltage, the trigger signal V10 supplied from the voltage detector 40 to the timing corrector 50 changes from high level to low level at time t5.

On the other hand, the output signal V14 of the comparator CP2 is high, the output of the SR flip-flop FF2 is high, and the switching element Q9 is OFF. As a result, the voltage V12 to the positive input terminal of the comparator CP2 keeps the constant level determined by the capacitor C8.

In a period from t5 to t6, the switching element Q6 turns off in response to a second low-level event of the trigger signal V10, so that the constant current I4 of the constant current source 52 passes through the diode D2 to charge the capacitor C7. Then, the voltage V11 to the negative input terminal of the comparator CP2 again increases.

When the increasing voltage V11 to the negative input terminal of the comparator CP2 exceeds (at t6) the voltage V12 supplied to the positive input terminal of the comparator CP2, the output signal V14 of the comparator CP2 changes from high level to low level at time t6.

In this way, when the trigger signal V10 shows a first low level event in an Off period of the switching element Q1, the capacitor C8 accumulates the voltage V12 and hold it. When the trigger signal V10 shows a second low level event in the OFF period of the switching element Q1, the voltage V11 starts at time t5 to increase in parallel with an increase in the voltage of the capacitor C7. These voltages V12 and V11 are compared with each other in the comparator CP2, and the timing t6 at which the voltage V11 exceeds the voltage V12 is detected as an estimated bottom time point at which the free oscillation voltage occurring at the drain of the switching element Q1 nearly reaches a bottom level the second time.

ON Period T5

At time t6, the one-shot circuit 54 detects that the output signal V14 of the comparator CP2 has changed from high level to low level and outputs an ON start signal V9 to turn on the switching element Q1. The ON start signal V9 is a high pulse signal (from t6 to t7) and is supplied to the set terminal of the SR flip-flop FF1 of the controller 60.

In response to the ON start signal V9, the SR flip-flop FF1 of the controller 60 outputs an ON/OFF control signal V17 which changes from low level to high level at time t6 to turn on the switching element Q1. At this time, the switching element Q5 turns on to discharge the capacitor C7, and also, the switching element Q10 turns on to discharge the capacitor C8.

Next Flyback Period T1

The feedback voltage V2 is supplied to the negative input terminal of the comparator CP3 and the voltage V15 is supplied to the positive input terminal of the comparator CP3. The voltage V15 is formed from a sawtooth drain current I3. More precisely, the sawtooth drain current I3 is converted by a resistor R1 into a voltage, which is passed through and shaped by a low-pass filter LPF70 into the voltage V15. At time t8, the voltage V15 exceeds the feedback voltage V2, and therefore, the comparator CP3 outputs a high-level output signal V16 to the reset terminal of the SR flip-flop FF1, to turn off the switching element Q1 from the ON state.

Modification

Figure 3:
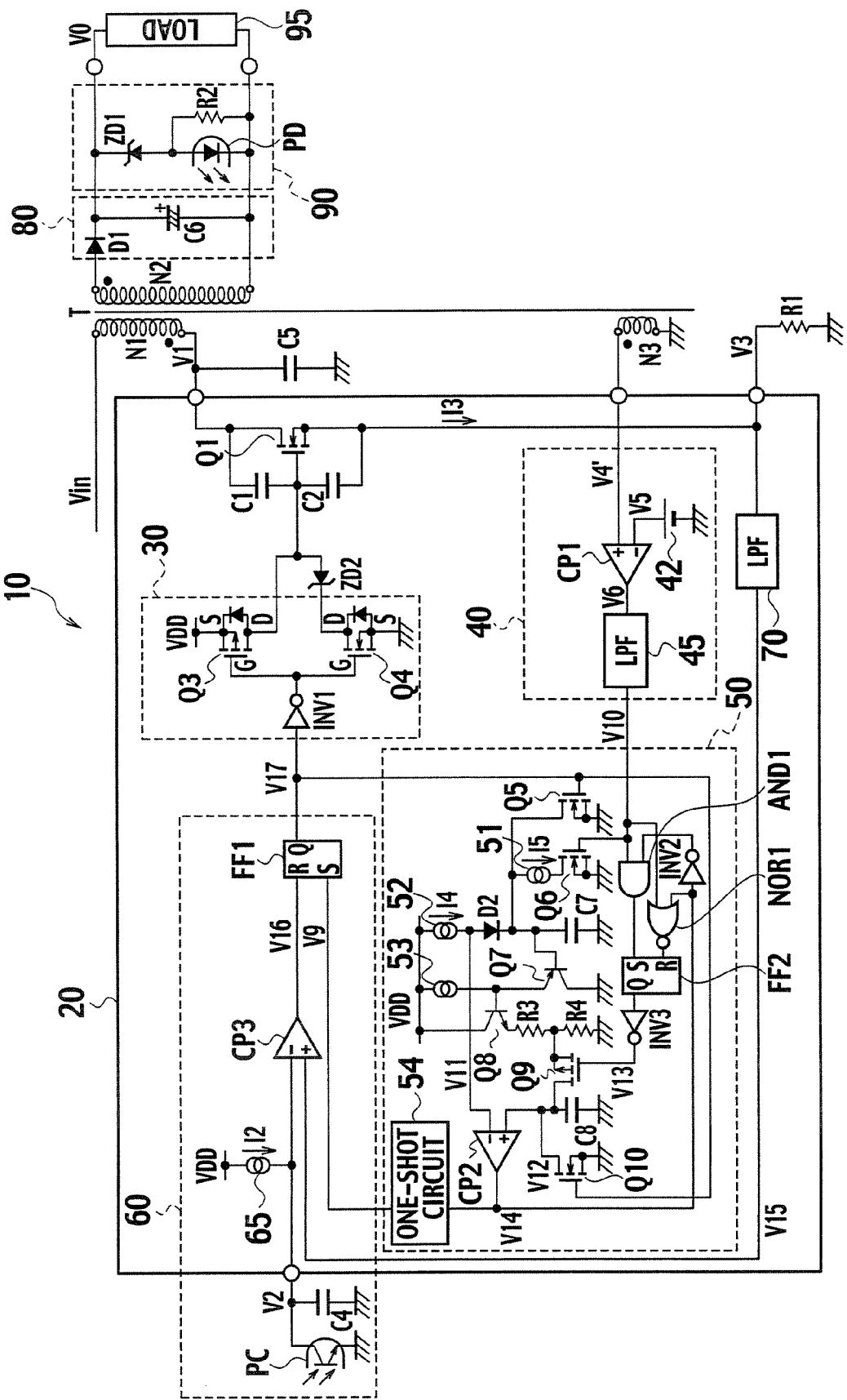
FIG. 3 is a view showing a switching power source apparatus according to another embodiment of the present invention.

FIG. 3 shows a modification of the switching power source apparatus shown in FIG. 1. The modification provides the primary side of the transformer T with a second winding N3. An end of the second winding N3 is connected to the positive input terminal of the comparator CP1 of the voltage detector 40, and the other end of the second winding N3 is grounded. The other parts of the modification are the same as those of the embodiment of FIG. 1. The second winding N3 generates a voltage which is similar to the drain voltage V1, and therefore, an AC signal V4' which is similar to the AC voltage V4 of FIG. 1 is supplied to the positive input terminal of the comparator CP1. The second winding N3 is used to detect a period of voltage free oscillation occurring after a flyback period, estimate a bottom point of the free oscillation like the embodiment of FIG. 1, and turn on the switching element Q1.

As explained above, the switching power source apparatus according to the present invention correctly estimates, in the semiconductor integrated circuit 20, the timing when a free oscillation voltage occurring at the drain of the switching element Q1 reaches a bottom level. Accordingly, the switching power source apparatus can turn on the switching element Q1 at an optimum time point without affected by the settings of the transformer and resonant capacitor. The present invention, therefore, can reduce the number of designing processes of the switching power source apparatus, improve the power conversion efficiency thereof, and minimize the switching noise thereof.

The present invention can minimize the package of the semiconductor integrated circuit, realize the quasi-resonance control method in the semiconductor integrated circuit to reduce a switching loss and noise, and simplify the structure of the switching power source apparatus.

According to the embodiment and modification mentioned above, the trigger signal V10 provided by the voltage detector 40 is supplied to the timing corrector 50. This configuration does not limit the present invention. Instead of the ON start signal V9 provided by the one-shot circuit 54 of the timing corrector 50, the trigger signal V10 provided by the voltage detector 40 may directly be supplied to the set terminal of the SR flip-flop FF1 arranged in the controller 60. This configuration can also realize the effect of the present invention.

In this way, the switching power source apparatus according to the present invention correctly estimates, in a semiconductor integrated circuit, the timing when a free oscillation voltage occurring at the drain of a switching element reaches a bottom level. Accordingly, the switching power source apparatus can turn on the switching element at an optimum time point without affected by the settings of a transformer and resonant capacitor arranged in the switching power source apparatus. The present invention, therefore, can reduce the number of designing processes of the switching power source apparatus, improve the power conversion efficiency thereof, and minimize the switching noise thereof.

This application claims benefit of priority under 35 USC §119 to Japanese Patent Applications No. 2005-301912, filed on Oct. 17, 2005, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A switching power source apparatus comprising:
   a switching element connected in series with a DC power source through a primary winding of a transformer;
   a voltage detector configured to detect timing synchronized with a period of voltage free oscillation and output a detection signal, the voltage free oscillation occurring at a gate of the switching element after a flyback period due to parasitic capacitance between terminals of the switching element or optionally added capacitance;
   a timing corrector configured to estimate timing when the voltage free oscillation substantially reaches a bottom level a second time or later and output an ON start signal at the estimated timing, according to the detection signal from the voltage detector;
   a controller configured to output an ON control signal to turn on the switching element in response to the ON start signal from the timing corrector; and
   a driver configured to apply a drive signal to the gate of the switching element and thereby drive the switching element in response to the ON control signal from the controller.

2. The switching power source apparatus of claim 1, wherein
   the timing corrector estimates, based on a first trigger signal provided by the voltage detector, timing when the voltage free oscillation substantially reaches a bottom level the second time or later and outputs the ON start signal in synchronization with the estimated timing.

3. The switching power source apparatus of claim 1, wherein the timing corrector comprises:
   a first capacitor configured to be selectively connected to and charged by a constant current source;
   a voltage retention circuit having a second capacitor, configured to selectively be connected to the first capacitor; and
   a comparator being connected to the first capacitor and the voltage retention circuit,
   the voltage retention circuit being connected to the first capacitor during an effective period of a first trigger signal provided by the voltage detector, holding a first voltage at the second capacitor,
   the first capacitor being charged during an effective period of a second trigger signal provided by the voltage detector, having a second voltage, and
   the comparator detecting a time point when the second voltage becomes higher than the first voltage and providing the detected time point as estimated timing at which the voltage free oscillation substantially reaches a bottom level the second time.

4. A switching power source apparatus comprising:
   a switching element connected in series with a DC power source through a primary winding of a transformer;
   a second winding of the transformer arranged on the primary side of the transformer;
   a voltage detector configured to detect timing synchronized with a period of voltage free oscillation and output a trigger signal, the voltage free oscillation occurring at the second winding after a flyback period;
   a timing corrector configured to automatically estimate timing when the voltage free oscillation substantially reaches a bottom level a second time or later and output an ON start signal at the estimated timing, according to the trigger signal from the voltage detector;
   a controller configured to output an ON control signal to turn on the switching element in response to the ON start signal from the timing corrector; and
   a driver configured to apply a drive signal to a gate of the switching element and thereby drive the switching element in response to the ON control signal from the controller.

* * * * *